United States Patent [19]

Wakamori et al.

[11] Patent Number: 4,712,182
[45] Date of Patent: Dec. 8, 1987

[54] METHOD OF ESTIMATING FRACTURE POINT OF PIPE LINE NETWORK

[75] Inventors: Fumio Wakamori, Machida; Hideo Ohata; Shinichiro Miyaoka, both of Kawasaki; Motohisa Funabashi, Sagamihara, all of Japan

[73] Assignee: Hitachi, Ltd., Tokyo, Japan

[21] Appl. No.: 841,827

[22] Filed: Mar. 20, 1986

Related U.S. Application Data

[63] Continuation of Ser. No. 587,527, Mar. 8, 1984, abandoned.

[30] Foreign Application Priority Data

Mar. 9, 1983 [JP] Japan .................................. 58-37396
Jun. 24, 1983 [JP] Japan ................................ 58-112724
Oct. 14, 1983 [JP] Japan ................................ 58-190727

[51] Int. Cl.$^4$ ........................ G01M 3/28; G06F 15/36; G06F 15/56
[52] U.S. Cl. ................................. 364/507; 73/40.5 R
[58] Field of Search ...................... 364/507; 73/40.5 R

[56] References Cited

U.S. PATENT DOCUMENTS

| | | | |
|---|---|---|---|
| 4,144,743 | 3/1979 | Covington et al. | 73/40.5 R |
| 4,280,356 | 7/1981 | Stewart | 73/40.5 R |
| 4,306,446 | 12/1981 | Fukuda | 73/40.5 R |
| 4,361,030 | 11/1982 | Heide | 73/40.5 R |
| 4,407,158 | 10/1983 | Petroff | 73/40.5 R |

FOREIGN PATENT DOCUMENTS

| | | | |
|---|---|---|---|
| 58-100730 | 6/1983 | Japan | 73/40.5 R |
| 58-211100 | 12/1983 | Japan | 73/40.5 R |
| WO80/2734 | 5/1980 | PCT Int'l Appl. | 73/40.5 R |

*Primary Examiner*—Felix D. Gruber
*Attorney, Agent, or Firm*—Antonelli, Terry & Wands

[57] ABSTRACT

In a method of estimating a fracture point of a pipe line network, a group of estimating rules based on distribution characteristics of extraordinary pressure variation, pipe line characteristics and flow continuity requirements in a fracture accident monitoring system for such networks represented by a large scale water distribution pipe line network are applied to reference data of flow rates and pressures both obtained in the normal consumption condition, and to measured data of the flow rate and the pressure to estimate the fracture point. In the method, application order of individual ones of the group of the estimating rules is decided in accordance with data conditions of the pipe line network. In the case that a range of a set of suspected abnormal joints can not be reduced sufficiently to the extent of a practical tolerance limit, a numerical simulation which supposes the existence of fracture on a certain joint in the set of suspected abnormal joints is conducted to further reduce the range of the set of suspected abnormal joints through a comparison between results of the numerical simulation and measured results. In order to increase an estimating speed, a parallel processing is conducted for the estimating rules which utilize only local data in the pipe line network, by way of a plurality of the special purpose reasoning processors.

6 Claims, 11 Drawing Figures

METHOD OF ESTIMATING FRACTURE POINT OF PIPE LINE NETWORK

This is a continuation of Ser. No. 587,527, filed Mar. 8, 1984, now abandoned.

BACKGROUND OF THE INVENTION

1. Field of the Invention:

The present invention relates to a method of monitoring a fracture occurrence in a pipe line network for distributing materials from a supply joint to a plurality of consumption joints, and more particularly to a method of estimating a fracture point of a large scale pipe line network in which measuring areas for flow rate and pressure in the network are restricted and, moreover, a fracture point is required to be rapidly detected and repaired.

2. Description of the Prior Art:

In the conventional method which is applied to a single pipe line, the existence of a fracture point in the pipe line is estimated from flow rates and pressures measured at both terminal ends of the pipe line. However, since existing pipe line networks are large in scale and complicated in structure, it is impossible to measure the flow rates and the pressures at all joints of the pipe line networks and it cannot be made to sufficiently reduce the range of a set of suspectedly abnormal joints for increasing speed of estimation. Consequently, it is difficult to apply the conventional method to large scale pipe line networks.

SUMMARY OF THE INVENTION

It is an object of the present invention to provide a method of estimating a fracture point of a pipe line network, suitable for the pipe line network of large scale, and the invention makes it possible to estimate the location of the fracture point at a high speed to such a degree dependent on a restricted portion of the pipe line network which the measured data is available for.

To attain the above-mentioned object, in the method of the present invention, findings necessary to estimate the location of the fracture point are formed into a series of rules which are independent of each other and regulate the ways of modifying the existing data of the pipe line network and producing new data of the pipe line network when data concerning the pipe line network conditions (hereinafter referred to as the network data) satisfy certain requirements, and the application order of the individual rules is determined in accordance with the network data, wherein the first feature of the method of the present invention resides. The second feature of the method of the present invention resides in the fact that an estimating range of the fracture point is reduced by using results of a numerical simulation by supposing the existence of a fracture point on a certain joint.

The third feature of the method of the present invention resides in the fact that the estimating speed is increased by conducting, with the use of a plurality of special purpose reasoning processors, parallel processing for the estimating rules which utilize only local data in the pipe line network.

DETAILED DESCRIPTION OF THE PREFERRED EMBODIMENTS

Now, with reference to FIGS. 1 to 6, an embodiment for determining the application order of individual rules in accordance with conditions of the network data will be explained as a first embodiment of the present invention.

Figure 1:
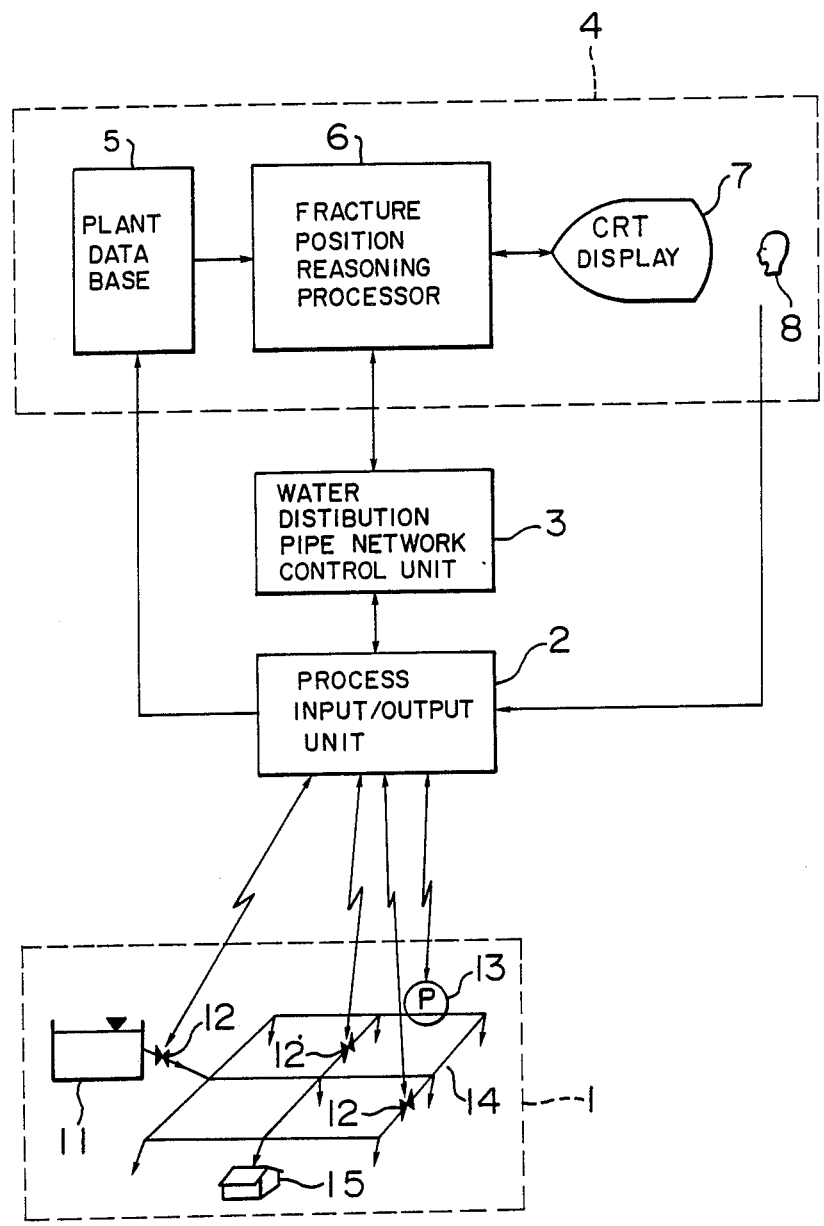
FIG. 1 is a functional block diagram of the water distribution pipe line network system to which the present invention is applied.

In FIG. 1, the entire construction of the water distribution pipe line network system to which the present invention is applied is shown. The pipe line network system 1 comprises a reservoir 11, a plurality of valves 12, a pump 13, a water distribution network 14 and several consumer ends 15. In normal operation of the pipe line network system 1, a water distribution pipe line network control unit 3 selects a control instruction on the basis of system data obtained through a process input/output unit 2. A signal corresponding to this instruction is transmitted to instruments such as the valves and the pump in the system through the process input/output unit 2. In the event that a fracture occurs, an accident monitoring system 4 detects the fracture, estimates the location thereof and determines a countermeasure to be taken. A fracture location reasoning processor 6 always stores in its memory system information reference data obtained from the water distribution pipe line network control unit 3 and system information measured data obtained through a plant data base 5. When the fracture is detected and the location thereof is estimated in accordance with the method of the present invention explained hereinafter, the result thereof is indicated on a CRT display 7. Then, an operator 8 determines a countermeasure in accordance with conditions of the indicated fracture, and sends a control instruction to the process input/output unit 2.

Figure 2:
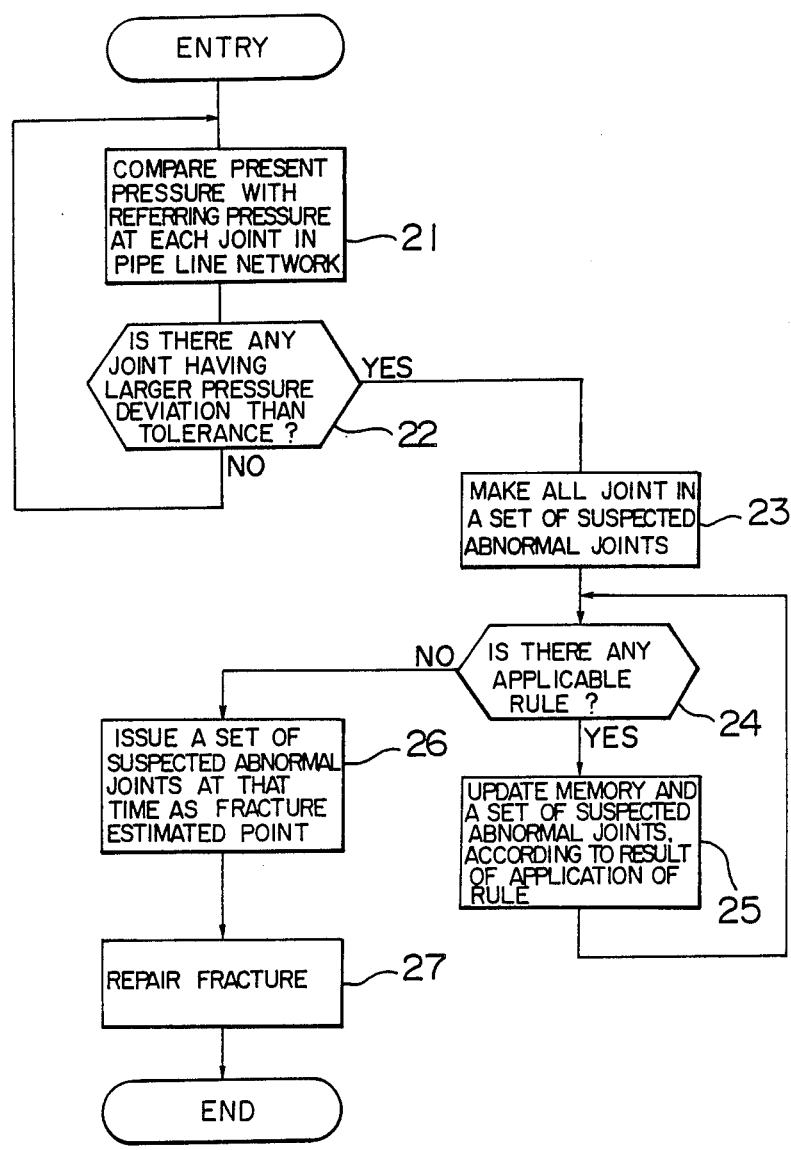
FIG. 2 is a flow chart showing a processing procedure of a first embodiment of the present invention.

FIG. 2 shows a flow chart of the process having the steps from detection of the fracture to estimation of a position of the fracture. At the step 21 at first, a reference pressure value at each joint in the pipe line network during a normal operation is compared with a measured pressure value. At the step 22, when a deviation thereof exceeds an allowable limit, it is considered that the fracture is detected. In this stage, fracture point estimating rules are sequentially applied to the data stored in the memory in accordance with a loop of steps 23, 24 and 25 to decide an estimating range in step 26, and repair the fracture in step 27.

Now, the process of applying the rules will be exemplified with reference to FIGS. 3 to 6.

Figure 3:
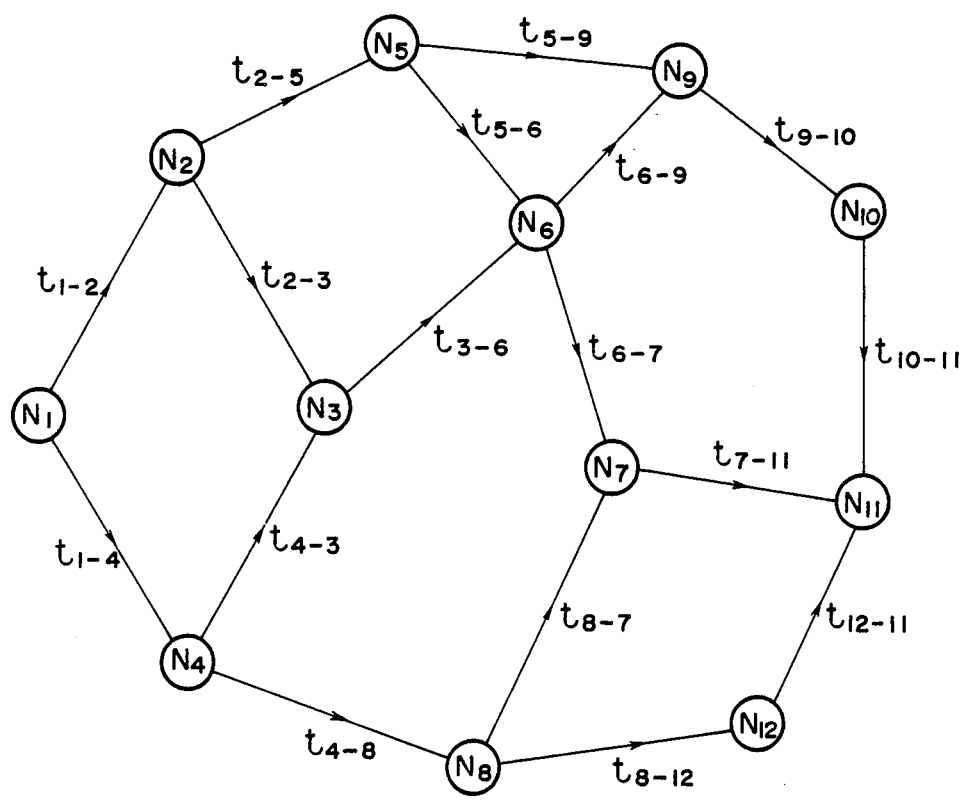
FIG. 3 is a view showing the water distribution pipe line network to which the present invention is applied.

In FIG. 3, an example of a water distribution pipe line network of the type to which the present invention is applied is shown. If parallel branches exist between joints in each pair, these parallel branches are previously unified. $N_1$ is a reservoir joint, and $N_2 \ldots N_{12}$ are consumption joints.

In this method, it is considered that water leakage from the fracture position is approximately indicated as an increase of water consumption at a certain joint near the fracture position. Such a certain joint is referred to as an abnormal joint, and the existence range thereof is estimated.

Figure 4:
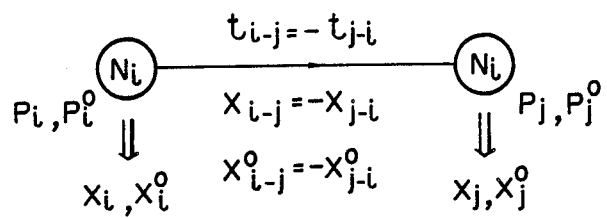
FIG. 4 is an explanatory view of employed symbols, and rules 1, 2.

At first, employed symbols are explained with reference to FIG. 4. A branch between the joints $N_i$ and $N_j$ is indicated by $t_{i-j}$, where: the direction of the branch is considered to be in the direction from $N_i$ to $N_j$, and a reverse direction thereof is indicated by $t_{j-i}$. Each variable has the following meaning:

$x_{i-j}$: flow rate in branch $t_{i-j}$
$P_i$: pressure at joint $N_i$
$P_j$: pressure at joint $N_j$
$X_i$: consumption flow rate at joint $N_i$
$X_j$: consumption flow rate at joint $N_j$
$x^0_{i-j}, P_i^0, X_i^0, X_j^0$: each reference value of $x_{i-j}, P_i, P_j, X_i, X_j$ in each normal condition;

when a function representing a flow rate/pressure characteristic of branch $t_{i-j}$ is referred to as $f_{i-j}$, the following equation (1) is established:

$$P_i - P_j = f_{i-j}(x_{i-j}) = -f_{j-i}(x_{j-i}) \quad (1)$$

Incidentally, the following equation is known as an experimental formula of $f_{i-j}$ (Japan Society of Civil Engineers, "Handbook of Hydraulic Formulas", 1971):

$$f_{i-j}(x_{i-j}) = R_{i-j}|x_{i-j}|^{1.85}\text{sgn}(x_{i-j})$$

where,
$R_{i-j}$: frictional resistance in pipe line; and
sgn($x_{i-j}$): sign of $x_{i-j}$ It is considered that, among the flow rate and the pressure in the pipe line network, the following items are measurable and therefore known:

flow rate: $x_{1-2}, x_{1-4}, x_{3-6}, x_{12-11}$
pressure: $P_1, P_3, P_6, P_{11}, P_{12}$.

At first, a set of suspected abnormal joints are defined as a whole set of joints as follows:

$$\{N_1, N_2, \ldots, N_{12}\}$$

Then, among the following rules 1 to 5, those applicable are sequentially performed:

[rule 1] (see FIG. 4)
When a flow rate in a certain branch $t_{i-j}$ is known, and, of the pressures $P_i$ and $P_j$ of two joints $N_i$ and $N_j$ adjacent to the branch $t_{i-j}$, one is unknown and the other is known, the unknown pressure is calculated by the branch characteristic equation (1) so as to become known.

Figure 5:
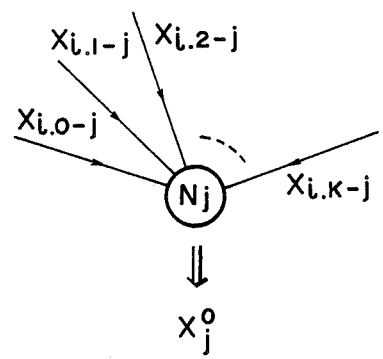
FIGS. 5 and 6 are explanatory views of rules 3 and 4, respectively.
Figure 6:
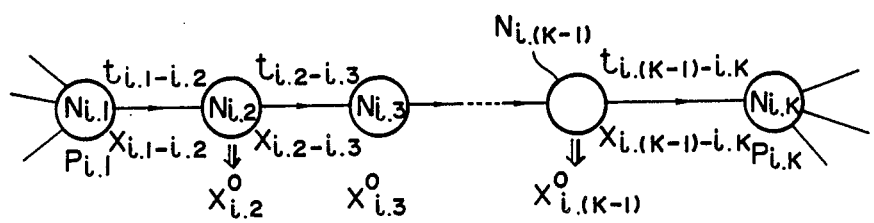

[rule 2] (see FIG. 4)
When a flow rate $x_{i-j}$ in a certain branch $t_{i-j}$ is unknown and both pressures $P_i$ and $P_j$ of two joints $N_i$ and $N_j$ adjacent to the branch $t_{i-j}$ are known, an unknown flow rate $x_{i-j}$ is calculated by the branch characteristic equation (1) so as to become known. [rule 3] (see FIG. 5)

When, among the flow rates in the branches $t_{i\cdot 0-j}, t_{i\cdot 1-j}, \ldots, t_{i\cdot k-j}$ adjacent to a certain joint $N_j$ which does not belong to the set of suspected abnormal joints only $x_{i\cdot 0-j}$ is unknown and all the other $x_{i\cdot 1-j}, \ldots, x_{i\cdot k-j}$ are known, the unknown flow rate $x_{i\cdot 0-j}$ is calculated by the following equation so as to become known:

$$x_{i\cdot 0-j} = X_j^p - \sum_{i=i\cdot 1, \ldots, i\cdot k} x_{i-j}$$

[rule 4] (see FIG. 6)
When, in a certain path having no branch therealong: $N_{i\cdot 1} \to t_{i\cdot 1-i\cdot 2} \to N_{i\cdot 2} \to t_{i\cdot 2-i\cdot 3} \to \ldots \to t_{i\cdot (k-1)-i\cdot k} \to N_{i\cdot k}$, all the flow rates $x_{i\cdot 1-i\cdot 2}, x_{i\cdot 2-i\cdot 3}, \ldots, x_{i\cdot (k-1)-i\cdot k}$ are unknown and both the pressures $P_{i\cdot 1}, P_{i\cdot k}$ of two joints $N_{i\cdot 1}, N_{i\cdot k}$ in both terminals ends are known, and further all the remaining joints $N_{i\cdot 2}, \ldots, N_{i\cdot (k-1)}$ do not belong to the set of suspected abnormal joints, the unknown flow rates $x_{i\cdot 1-i\cdot 2}, x_{i\cdot 2-i\cdot 3}, \ldots, x_{i\cdot (k-1)-i\cdot k}$ are calculated by the following simultaneous equations so as to become known:

$$P_{i\cdot 1} - P_{i\cdot k} = f_{i\cdot 1-i\cdot 2}(x_{i\cdot 1-i\cdot 2}) + f_{i\cdot 2-i\cdot 3}(x_{i\cdot 2-i\cdot 3}) + \ldots +$$

$$f_{i\cdot (k-1)-i\cdot k}(x_{i\cdot (k-1)-i\cdot k})$$

$$X^0_{i\cdot 2} = x_{i\cdot 1-i\cdot 2} - x_{i\cdot 2-i\cdot 3}$$

$$X^0_{i\cdot 3} = x_{i\cdot 2-i\cdot 3} - x_{i\cdot 3-i\cdot 4}$$

$$\ldots$$

$$X^0_{i\cdot (k-1)} = x_{i\cdot (k-2)-i\cdot (k-1)} - x_{i\cdot (k-1)-i\cdot k}$$

[rule 5]
When, among the pressures $P_{i\cdot 0}, P_{i\cdot 1}, \ldots, P_{i\cdot k}$ of the joints $N_{i\cdot 0}, N_{i\cdot 1}, \ldots, N_{i\cdot k}$ belonging to the set of suspected abnormal joints, two or more pressures are known, the set of suspected abnormal joints are updated in accordance with the following procedure:

(step 1): searching a joint in which the pressure drop $P_{1\cdot 0}{}^0 - P_{i\cdot 0}, P_{i\cdot 1}{}^0 - P_{i\cdot 1}, \ldots, P_{i\cdot k}{}^0 - P_{i\cdot k}$ reaches its maximum, and supposing the joint to be $N_{i\cdot 0}$;

(step 2): preparing a new set of suspected abnormal joints by subtracting $N_{i\cdot 1}, N_{i\cdot 2}, \ldots, N_{i\cdot k}$ from the present set of suspected abnormal joints;

(step 3): searching the joints along all the adjacent branches from the joint $N_{i\cdot 0}$ until a joint not belonging to the set of suspected abnormal joints is found.

(step 4): updating the definition of a set of suspected abnormal joints with the use of the set of joints obtained during the search of the step 3.

The meaning of each rule is briefly explained as follows: rules 1 and 2 are based on the pipe line characteristic, rule 3 is based on the flow continuity requirements, rule 4 is based on both the pipe line characteristic and the flow continuity requirements, and rule 5 is based on a distribution characteristic of the pressure drop.

A set of suspected abnormal joints, which is obtained when all the above-mentioned rules can not be applied, is an estimated range of the fracture position according to the present method.

The following is a result of the applications of these rules, assuming that an abnormal joint is $N_7$: incidentally, although the route processing progress depends on the application order of the rules, it is noted that the same ultimate result is obtained:

(1) At first, by applying rules 1 and 2, flow rates $x_{2-3}$ and $x_{4-3}$ and pressures $P_2$ and $P_4$ are determined, that is, by applying rule 1, $P_2$ and $P_4$ can be ascertained because two sets, $P_1$ and $X_{1-2}$ and $P_1$ and $X_{1-4}$ are known, and by applying rule 2, $X_{2-3}$ and $X_{4-3}$ can be ascertained from ascertained $P_2$ and known $P_3$ and from ascertained $P_4$ and known $P_3$.

(2) In this stage, only the rule 5 is applicable. By assuming that the maximum point of the known pressure drop is in the joint $N_6$, $\{N_5, N_6, N_7, N_8, N_9, N_{10}\}$ is obtained as a new set of suspected abnormal joints, that is, by comparing the pressure drops among the joints $N_1$, $N_2$, $N_3$, $N_4$, $N_6$, $N_{11}$ and $N_{12}$, the pressure drop at the joint $N_6$ can be found to be maximum from the above-discussed estimation and, therefore, the other above-mentioned joints can be eliminated from the set of suspected joints. Accordingly, a reduced number of suspected joints, the set $N_5$, $N_6$, $N_7$, $N_8$, $N_9$, $N_{10}$, is obtained.

(3) By applying the rule 3, the flow rates $x_{2-5}$, $x_{4-8}$ and $x_{8-12}$ are known that is, since the joint $N_2$ is normal as found in (2) above, and $X_{1-2}$ and $X_{2-3}$ are known, $X_{2-5}$ can be ascertained; and since the joint $N_4$ is normal as found in (3), and $X_{1-4}$ and $X_{4-3}$ are known, $X_{4-8}$ can be ascertained. Further, since the joint $N_{12}$ is normal and $X_{12-11}$ is known, $X_{8-12}$ can be ascertained.

(4) By applying the rules 1 and 2, the flow rate $x_{5-6}$ and the pressures $P_5$ and $P_8$ are known.

(5) The rule 5 is applied. By assuming the maximum value of the pressure drops $P_5^0-P_5$, $P_6^0-P_6$ and $P_8^0-P_8$ is $P_6^0-P_6$, $\{N_6, N_7, N_9, N_{10}\}$ is obtained as a new set of suspected abnormal joints.

(6) By applying the rules 1, 2 and 3, the flow rates $x_{5-9}$, $x_{8-7}$, $x_{6-9}$, $x_{6-7}$, $x_{7-11}$, $x_{10-11}$ and $x_{9-10}$ and the pressures $P_7$, $P_9$ and $P_{10}$ are known.

(7) The rule 5 is applied. Among the pressure drops $P_6^0-P_6$, $P_7^0-P_7$, $P_9^0-P_9$ and $P_{10}^0-P_{10}$, $P_7^0-P_7$ is the maximum pressure drop. Therefore, $\{N_7\}$ becomes a set of suspected abnormal joints.

(8) Applicable rule disappears. At this time, $\{N_7\}$ is a set of suspected abnormal joints. Therefore, the abnormal joint is properly estimated.

Since the estimation of a fracture point is performed in a manner corresponding to the measured data, the estimating method of the present invention can be effectively applied to a large scale pipe line network. In addition to the above effect, another effect is obtained in that the method of the present invention is applicable without modifying the estimating rules even if the measuring points are changed.

Although the first embodiment is applied to the water distribution pipe line network for drinking water, the method of the present invention is also applicable to other conveyance network systems such as a gas pipe line network, an oil pipe line network and an electric power system.

Next, as a second embodiment of the present invention, an embodiment performing a numerical simulation by supposing the existence of a fracture position on a certain joint, is explained with reference to FIGS. 1, 7 and 8.

As shown in FIG. 1, extraordinary values of flow rate and pressure at the occurrence of a fracture of the pipe line network are transmitted to the plant data base 5 through the process input/output unit 2 and stored therein. The fracture position reasoning processor 6 always monitors the contents stored in the plant data base 5 to detect the extraordinary value stored therein, and then drives its internally stored reasoning processing program to estimate the fracture position. In the estimating process, when it becomes impossible to further reduce the set of suspected abnormal joints, i.e., the set including a suspected area as to the fracture, the fracture position reasoning processor 6 drives its internally stored plant simulator to further reduce the suspected area as to the fracture. The area name included in the set of suspected abnormal joints, which is obtained by the above procedure is indicated on the CRT display 7. The operator 8, upon confirming the indication on the CRT display 7, determines a necessary countermeasure so as to send a control instruction to the process input/output unit 2 directly or through the water distribution pipe line network control unit 3.

Figure 7:
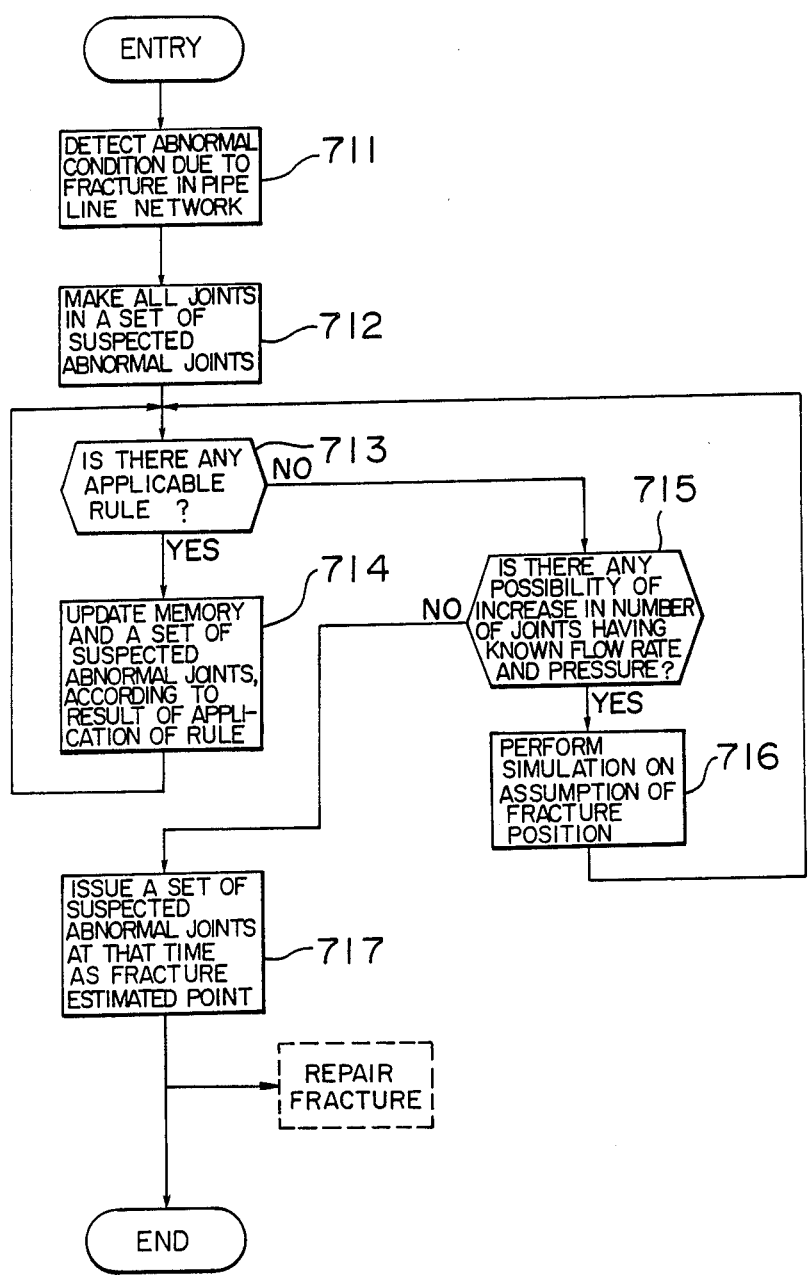
FIG. 7 is a flow chart showing a processing procedure of a second embodiment of the present invention.
Figure 8:
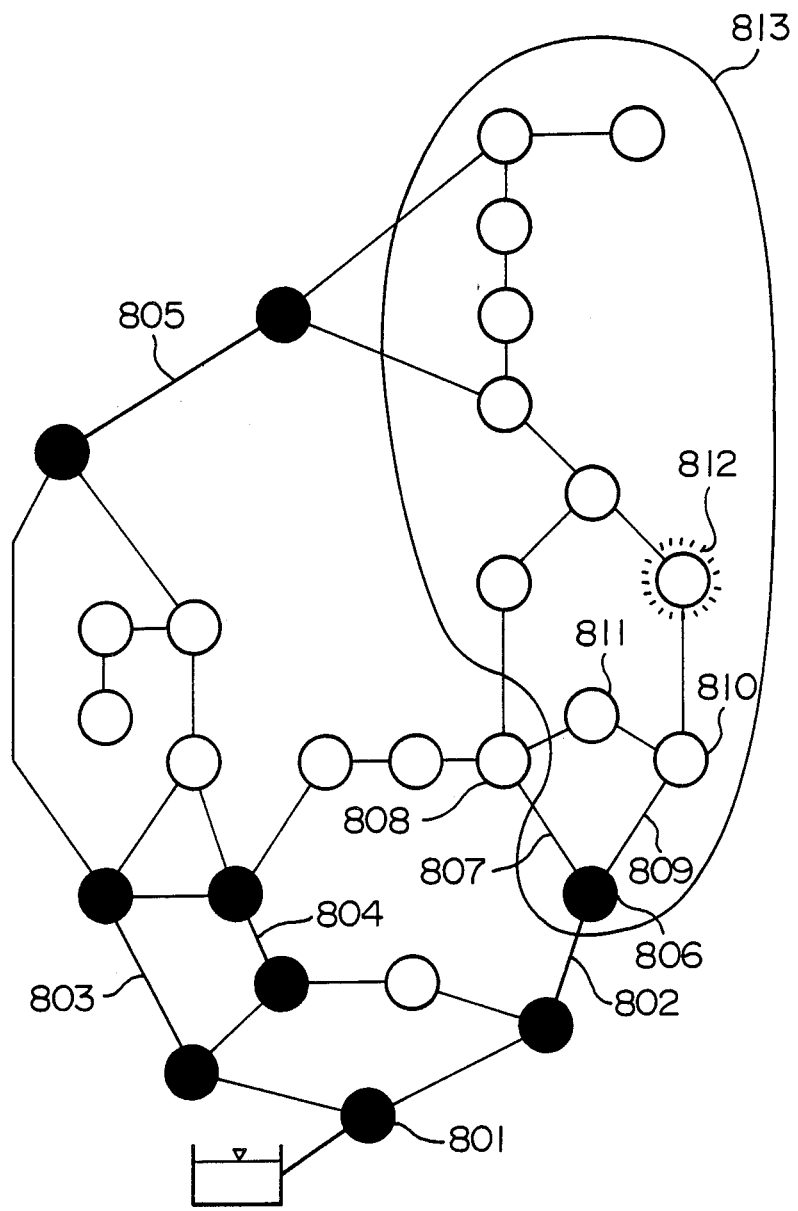
FIG. 8 is a view showing an example of a distribution of measuring points and a set of suspected abnormal joints in the water distribution pipe line network to which the second embodiment is applied.

In FIG. 7, a processing procedure including a process of utilizing the plant simulator applied in the estimation of the fracture position, which process is a feature of the second embodiment, is shown. When a condition of the fracture of the pipe line network is detected at the step 711, the entire pipe line network forms a set of suspected abnormal joints at the step 712, and rules described later are applied through a loop of the steps 713 and 714 to update and reduce the set of suspected abnormal joints. When an applicable rule disappears and an abnormal joint is still not specified, a possibility of increasing the points in which flow rates and pressures are known is judged at the step 715 through a simulation which is performed at the step 716. According to the result thereof, the processing procedure returns to the loop of the steps 713 and 714 again. The procedure of the above steps 713 to 716 is repeated until the set of suspected abnormal joints can not be further reduced, and a result thereof is issued from the step 717 as an output to decide a countermeasure such as repairing the fracture.

In order to estimate the fracture position in the above, it is sufficient to apply the above-mentioned rules 1 to 5. The above rules are applied to the water distribution pipe line network which is diagrammatically shown in FIG. 8. In FIG. 8, a circular mark indicates a joint, and a connecting line therebetween indicates a pipe line referred to as a branch in the above description. In FIG. 8, a joint 801 indicates a reservoir joint from which water is supplied to other joints. At this time, it is considered that, as premises of the estimation of the fracture position, a flow rate in each joint during a normal consumption of water and each normal pressure at this time are known. In branches 802, 803, 804 and 805, control valves are provided to make it possible to distribute water to the terminal ends of the branch under a proper pressure, and a flow rate in each branch and pressure in both terminal ends of each branch (marked with a black spot) are always monitored. With regard to the fracture estimating problem, for example, when the fracture occurs near a joint 812 which is not directly monitored as to pressure under such circumstances, the rules in which the premises described in the aforementioned rules 1 to 5 as conditions are established are searched, and the contents described as conclusions of pertaining rules are performed to find out the joint 812 in the vicinity of which the fracture occurred. By sequentially applying the rules to the pipe line network shown in FIG. 8, a set 813 of suspected abnormal joints are obtained, and a further applicable rule disappears. At this time, utilization of the simulator which is a feature of the present embodiment is done to perform a simulation on the assumption that the accidental fracture occurs at a joint 806 the pressure of which is known, which joint 806 belongs to the set of suspected abnormal joints. However, since the fracture accident occurs in the joint 812, the result of the simulation is not coincident with the measured value. As a result, it becomes possible to eliminate the joint 812 from the set of suspected abnormal joints pertaining to the fracture, and become thereby possible to further perform the estimation. Namely, with regard to the branch 807, the joint 808 is already eliminated from the set of suspected abnormal joints and, as is clear from the above description, the joint 806 is also eliminated from the set of suspected abnormal joints. As a result, an application condition of the above-mentioned rule 2 is prepared by the above eliminations. Consequently, it becomes possible to know the flow rate of the branch 807. Next, with regard to the joint 806, an application condition of the rule 4 is established as the flow rate of the branch 807 becomes known, and, then, the flow rate of the branch 809 becomes known.

When the estimating process comes to the limit of the proceeding, a simulation is performed on the assumption that the fracture occurs at a joint of the set of suspected abnormal joints, and thereby an application condition of the rules is prepared to reduce the set of suspected abnormal joints. As a result of the above, the fracture joint 812 is finally obtained through the estimation.

In accordance with the estimating method according to the present embodiment, it becomes possible to further advance a reasoning, and to enhance the accuracy of the estimating of the fracture position by appropriately performing a simulation on the assumption that the fracture occurs at a certain joint the pressure of which is known, even if the application of the reasoning rules for sequentially reducing the set of suspected abnormal joints can not be done due to lack of measured data of both flow rate and pressure obtained in the estimation of the fracture position at a time when the fracture of the pipe line in the pipe line network of a large scale occurs.

Incidentally, although the second embodiment is applied to a water distribution pipe line network for drinking water, the method of the present invention is also applicable to other conveyance network systems, for example, a gas pipe line network, an oil pipe line network and an electric power system.

Finally, as a third embodiment of the present invention, an embodiment performing parallel processing of local reasoning rules through a plurality of processors for exclusive use is explained with reference to FIG. 1 and FIGS. 9 to 11.

Figure 9:
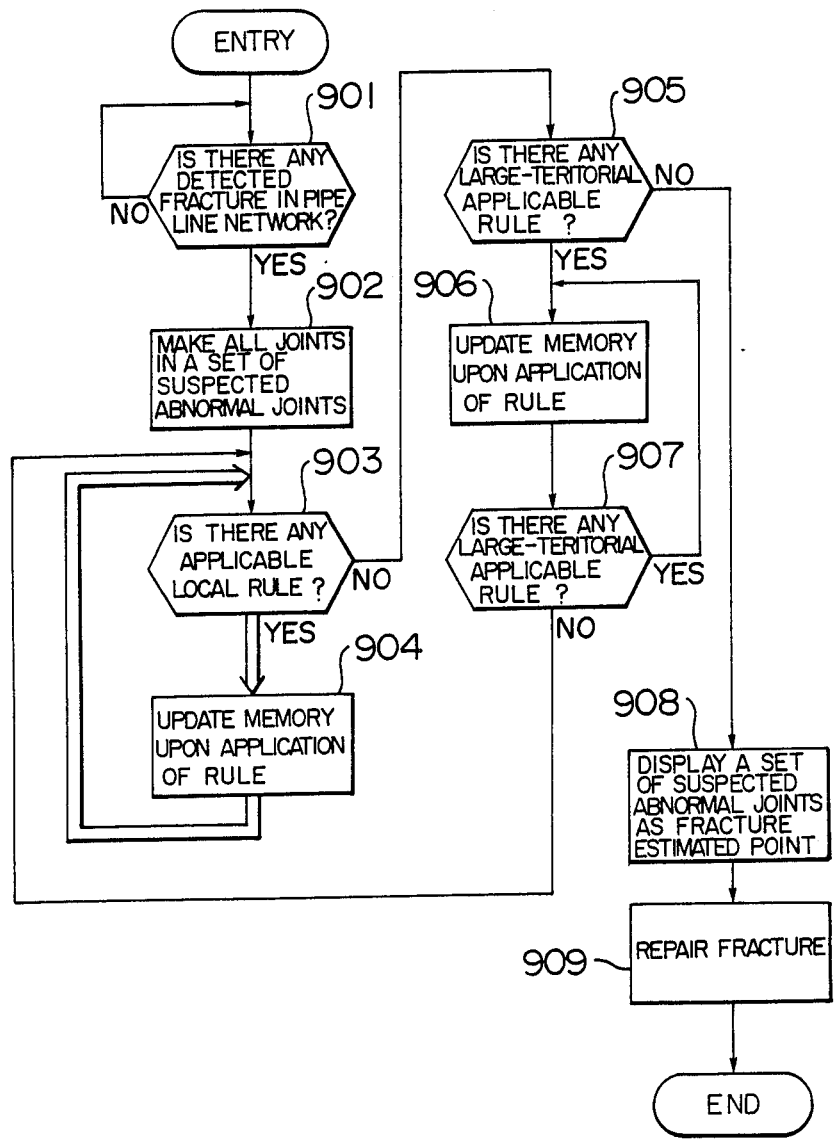
FIG. 9 is a flow chart showing a processing procedure of a third embodiment of the present invention.

In FIG. 9, a processing procedure is shown. When the occurrence of a fracture is detected in the step 901, first of all, a set of suspected abnormal joints are initialized as a whole set of joints. In a loop of the steps 903 to 904, rules for deciding values of a flow rate and pressure both of which can not be measured, on the basis of local data are applied to supplement observation data. Since an interference between the loops disappears due to localization, a parallel processing is realized with the use of a plurality of special purpose reasoning processors. This is indicated by means of a bold line with which the loop of the steps 903 to 904 is shown in FIG. 9. When an applicable local rule disappears, the reasoning process is continued by using a large territorial rule after which the process procedure is transferred to the steps 906 to 907. In this loop, the rules for reducing the set of suspected abnormal joints are applied. When both local rules and large territorial rules become inapplicable after alternatively performing a loop of the steps 903 to 904 and another loop of the steps 906 to 907, a set of suspected abnormal joints at that time is indicated on the CRT 7 display as a range of the estimating of fracture position, and its countermeasure is decided in a step 909 by an operator 8.

There are LR 1 to 3 in the local rules as follows:

[LR 1]
if: a flow rate of a certain branch is known, and, of the pressures of joints adjacent to it, one is known and the other is unknown; and
then: an unknown pressure is calculated from a branch characteristic equation to become known;

[LR 2]
if: a flow rate of a certain branch is unknown, and both pressures of joints adjacent to it are known, and
then: an unknown flow rate is calculated from a branch characteristic equation to become known;

[LR 3]
if: in a certain joint not belonging to the set of suspected abnormal joints, one of flow rates of branches adjacent to the certain joint is unknown;
then: an unknown flow rate is calculated from flow rate continuity requirements to become known;

There are GR 1 to 2 in the large territorial rules as follows:

[GR 1]
if: in paths having no branch therealong, all joint pressures of both terminal ends of each path are known, all joint pressures in each path and all branch flow rates are unknown, and all joints in each path do not belong to a set of suspected abnormal joints; and
then: unknown flow rates are calculated from simultaneous equations composed from each branch characteristic equation to become known;

[GR 2]
if: two or more joints in which pressures are known are included in a set of suspected abnormal joints;
then: of joints in which pressures are known, and which joints belong to a set of suspected abnormal joints a joint in which a pressure drop from a normal condition is maximum is selected, and the other joints are eliminated from the set of suspected abnormal joints. Paths are searched from the selected joint as a starting point along all branches adjacent thereto until a joint not belonging to the set of suspected abnormal joints is found. A new set of suspected abnormal joints are defined on the basis of the joint used as the starting point and the joints in the paths searched in the above.

Figure 10:
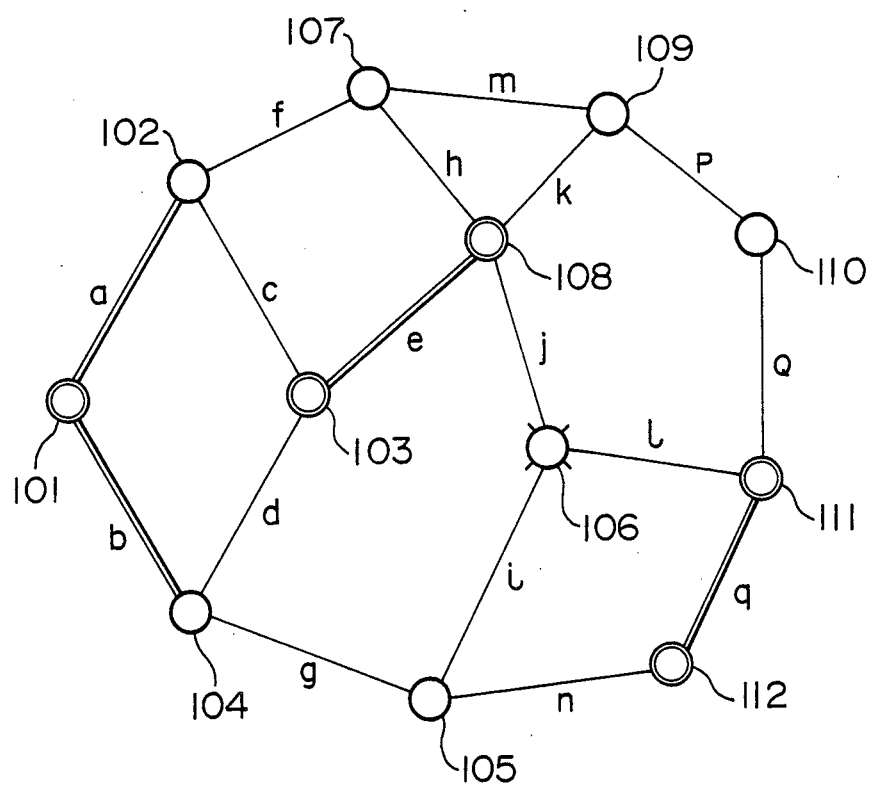
FIG. 10 is a view showing a construction of the water distribution pipe line network to which the third embodiment is applied.

Applying the process of the rule is exemplified with regard to a simple pipe line network as follows:

In FIG. 10, a pipe line network to which the rules are applied is diagrammatically shown. Water is supplied to demand joints 102 to 112 through pipe lines a to q from a reservoir joint 101. It is considered that a joint demand under a normal condition of the pipe line network and joint pressure distribution are known, and that, for example, pressures of joints 101, 103, 108, 111 and 112 and flow rates of branches a, b, e and q are measured. The method of estimating the fracture position of the present invention is one for performing a parallel processing by using rules on the basis of the above-mentioned known data when the fracture occurs, for example, near the joint 106 to find out the abnormal joint 106.

For example, local reasoning processors LP 1 to 8 and large territorial reasoning processor GP are prepared as special purpose processors for a parallel reasoning process as follows:

LP1 {LR1, LR2; a, e, i, m, q}
LP2 {LR1, LR2; b, f, j, n}
LP3 {LR1, LR2; c, g, k, o}
LP4 {LR1, LR2; d, h, l, p}
LP5 {LR3; 101, 105, 109}
LP6 {LR3; 102, 106, 110}
LP7 {LR3; 103, 107, 111}
LP8 {LR3; 104, 108, 112}
GP {GR1, GR2} where: local reasoning processor LP1 always refers to flow data of the branches a, e, i, m and g and the pressure data of joints adjacent thereto, and performs a processing according to the contents of the "then" portion of either local rule LR1 or LR2 when the conditions of the "if" portion of the same rule are satisfied at the time when the local reasoning processor LP1 is in a local reasoning mode shown in FIG. 9. The above explanation is also applied to LP2 to LP4. A local reasoning processor LP5 always refers to flow rate data of branches adjacent to joints 101, 105 and 109, and performs a processing according to the contents of the "then" portion of local rule LR3 when the conditions of the "if" portion of the same rule are satisfied at the time when the local reasoning processor LP5 is in a local reasoning mode, the above explanation is also applied to LP6 to LP8. A large territorial reasoning processor GP refers to the entire pipe line network, and performs processing according to contents of the "then" portion of either large territorial rule GR1 or GR2 when the conditions of the "if" portion of the same rule are satisfied at the time when the large territorial reasoning processor GP is in a large territorial reasoning mode.

Figure 11:
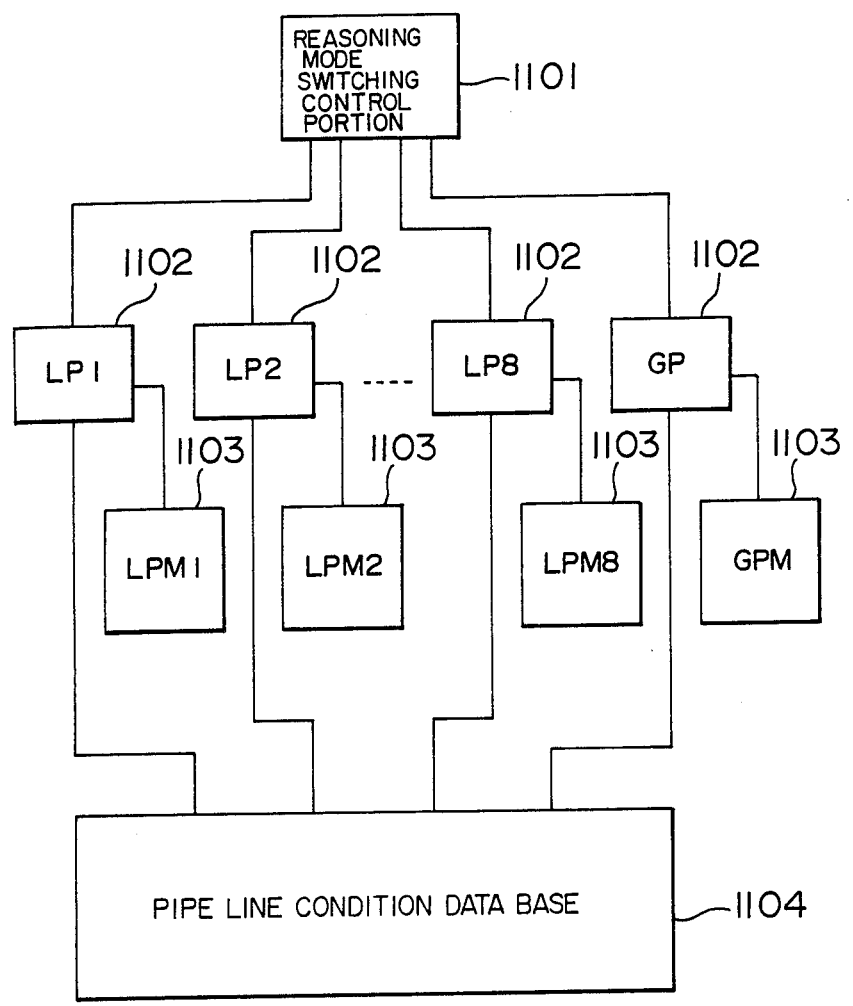
FIG. 11 is a view showing a construction composed of a plurality of reasoning processors and a memory.

In FIG. 11, construction of a parallel reasoning processor and a memory is shown. Information regarding the pipe line network such as flow rate and pressure, and the set of suspected abnormal joints, etc. are stored in a pipe line network condition data base 1104. Each of the reasoning processors 1102 (LP1 to 8, GP) can access data defined in accordance with the above description, among the stored information. Contents of rules allotted to the individual processors are stored in memories 1103 (LPM 1 to 8, GPM) for exclusive use, respectively. A reasoning mode switching control portion 1101 communicates with each processor to switch the mode between the modes of the local reasoning process and the large territorial reasoning process.

An exemplary flow of reasoning processing is described as follows:

A set of suspected abnormal joints are initialized as a whole set of joints, and enter the local reasoning mode. At this time, it is possible to perform a parallel processing of LP1 (LR1; a) and LP2 (LR1; b): where: LP1 (LR1; a) is a symbolized indication meaning that the local reasoning processor LP1 applies the local rule LR1 to the flow data of branch a and the pressure data of joints 101 and 102 adjacent thereto. The above explanation is also applied to LP2 (LR1; b).

When the above reasoning processing is finished, LP3 (LR2; c) and LP4 (LR2; d) are performed, and thereafter a transition to the large territorial reasoning mode is performed. When a pressure drop of the joint 108 is maximum among those of joints in which the pressures are known, a set of suspected abnormal joints are reduced to {105, 106, 107, 108, 109, 110} by performing GP (GR2). Then, a transition to the local reasoning mode is performed to simultaneously process LP6 (LR3; 102) and LP8 (LR3; 104), and thereafter processings of LP8 (LR3; 112), LP2 (LR1; f) and LP3 (LR1; g) are performed.

In the same manner as above, a reasoning processing is performed while the local reasoning mode and the large territorial reasoning mode are alternately switched. Ultimately, an applicable rule disappears when the set of suspected abnormal joints becomes {106}, and the reasoning process is finished. Consequently, in this case, it is possible to estimate an abnormal joint properly.

Incidentally, as is recognized from this example, a special consideration is required as to a process allotting a reasoning procedure among parallel reasoning processors. For example, although it is possible to apply the rules to the branches a, e, i, m and q through the processor LP1, these branches should be distributed a scattering manner in the pipe line network in order to enhance the redundancy of the reasoning processing.

Incidentally, although the third embodiment is applied to a water distribution pipe line network, the method of the present invention is also applicable to other conveyance network systems, for example, a gas pipe line network, an oil pipe line network and an electric power system.

According to the reasoning method of the present invention, since it is possible to apply a simultaneous parallel processing utilizing a local character of calculation processing to the pipe line network data, it is possible to estimate a fracture position at high speed even in the pipe line network of a large scale, and thereby to obtain an effect that a countermeasure based on such estimation becomes more effective.

What is claimed is:

1. A method of estimating a fracture point in a large scale network for the distribution of water, gas, oil or electrical power provided therein with joints and with a fracture monitoring system, comprising the steps of
   (a) initially selecting a set of suspected abnormal joints in the network;
   (b) successively applying through apparatus associated with the system a set of estimating rules which comprise (1) calculation of an unknown pressure at a joint of a branch in which flow rate is known and pressure in another joint of the branch is known, (2) calculation of a flow rate on a branch when pressure at joints of the branch are known, (3) calculation of the flow rate in a branch among a plurality of branches adjacent to a joint not belonging to the selected set of suspected abnormal joints, (4) calculation of flow rates in a path having no branches therealong where pressures at the ends of the path are known and joints between joints at the end of the path do not belong to the selected set of suspected abnormal joints, and (5) when two or more pressures of the joints belonging to the suspected set are known, searching a joint of the suspected set in which the pressure drop reaches a maximum,
   (c) preparing through the apparatus a new set of suspected joints by removing from the new set the joints of the initial suspected set at which the pressure drops are known other than the joint exhibiting the maximum pressure drop, from the initial set of suspected abnormal joints, searching the joints along branches adjacent the joint of maximum pressure drop until a joint not belonging to the initial set of suspected abnormal joints is found, and updating the definition of a set of suspected abnormal joints with the use of set of joints obtained during said searching, and (d) successively reducing the number of suspected abnormal joints in the selected set until the fracture point is located.

2. In a method of estimating a fracture point in a large scale water distribution pipeline network provided therein with a fracture monitoring system, comprising the steps of preselecting a set of suspected abnormal joints, successively applying estimating rules via apparatus associated with the system based upon distribution characteristics of extraordinary pressure variations, pipeline characteristics and flow continuity requirements to reference data of flow rates and pressures obtained in normal consumption conditions and to measured data of flow rates and pressures, determining an application order of individual rules of said estimating rules in accordance with data conditions of said pipeline network, and successively reducing the number of suspected abnormal joints in said preselected set which includes said suspected fracture point until said fracture point is estimated.

3. In a method of estimating a fracture point in a large scale water distribution pipeline network provided with a fracture monitoring system, in which estimating rules based upon distribution characteristics of extraordinary pressure variations, pipeline characteristics and flow continuity requirements, are successively applied via apparatus associated with the system to reference data of flow rates and pressures both obtained in normal consumption condition, and to measured flow rates and pressures data in a set of joints preset to include said suspected fracture point, thereby successively reducing the number of suspected abnormal joints in the set until said fracture point is estimated, and the method further including the step, when rules applicable to said estimating rules have disappeared, of utilizing results of numerical simulation which supposes the existence of a fracture point.

4. In an apparatus for estimating a fracture point in a large scale water distribution pipeline network provided therein with a fracture monitoring system, in which means is provided for successively applying estimating rules based upon distribution characteristics of extraordinary pressure variations, pipeline characteristics and flow continuity requirements, to reference flow rates and pressures data obtained in a normal consumption condition and to measured flow rates and pressures data, thereby successively reducing the number of suspected abnormal joints in a set of joints preset to include said suspected fracture, so that said fracture point is estimated, the improvement comprising a plurality of special purpose reasoning processors for conducting parallel processing for said estimating rules using only local data in said pipeline network.

5. A method of estimating a fracture point in a large scale network for the distribution of water, gas, oil or electrical power provided therein with joints and with a fracture monitoring system, comprising the steps of (a) selecting a set of suspected abnormal joints in the network, said joints having data of pressures and flow rates which are all known in a normal condition of the network;

(b) obtaining data of measured flow rates and pressures at certain suspected abnormal joints in said set of suspected abnormal joints, (c) successively applying a set of estimating rules for identifying said fracture point, to the thus measured data and the data in the normal condition of the network;

(d) successively applying a set of estimating rules for identifying said fracture point, to reference data of flow rates and pressures at certain joints in said set in said normal condition and the data of measured flow rates and pressures so as to obtain the pressure drops from the pressures in the normal condition at joints as far as possible, (e) withdrawing joints with said pressure drops which are known, regarded as those in the normal condition, other than a joint with a maximum one of said pressure drops, from said set of suspected abnormal joints, searching joints along branches around said joint with said maximum pressure drop until a joint not belonging to the initial set of suspected abnormal joints is found, and renewing said set of suspected abnormal joints with the use of joints obtained during searching and not yet evaluated as to their condition, and including said joint with the maximum pressure drop, (f) displaying said new set of suspected joints on a display unit for checking the condition of said network, (g) repeating the application of said rules to the suspected joint in said renewed set to suspectively reduce the number of suspected abnormal joints in the renewed set until the fracture point is located, and (h) outputting said located fracture point for repairing the same.

6. A method of estimating a disruption point in a large scale distribution network provided therein with junction points and with a disruption monitoring system, comprising the steps of (a) selecting a set of suspected abnormal junction points in the network, said junction points having data which are all known in a normal condition of the network;

(b) obtaining measured data at certain suspected abnormal junction points in said set of suspected abnormal junction points, (c) successively applying via a processor a set of estimating rules for identifying said disruption point, to the thus measured data and the data in the normal condition of the network;

(d) successively applying via the processor a set of estimating rules for identifying said disruption point, to reference data at certain junction points in said set in said normal condition and the measured data so as to obtain changes in value from the data in the normal condition at junction points to the extent possible, (e) withdrawing junction points with said value changes which are known, regarded as those in the normal condition, other than a junction point with a maximum one of said value changes, from said set of suspected abnormal junction points, searching junction points along branches around said junction point with said maximum value change until a junction point not belonging to the initial set of suspected abnormal junctional points is found, and renewing said set of suspected abnormal junction points with the use of junction points obtained during searching and now yet evaluated as to their condition, and including said junction point with the maximum value change, (f) displaying said new set of suspected junction points on a display unit for checking the condition of said network, (g) repeating the application of said rules via the processor to the suspected junction points in said renewed set to suspectively reduce the number of suspected abnormal junction points in the renewed set until the disruption point is located, and (h) outputting said located disruption point for repairing the same.

* * * * *